(12) United States Patent
Yang et al.

(10) Patent No.: US 6,432,501 B1
(45) Date of Patent: Aug. 13, 2002

(54) PRESSURE SENSITIVE INK JET MEDIA FOR DIGITAL PRINTING

(75) Inventors: Victor Yang, Longmeadow; Norman P. De Bastiani, So. Hadley, both of MA (US)

(73) Assignee: Chartpak, Inc., Leeds, MA (US)

( * ) Notice: Subject to any disclaimer, the term of this patent is extended or adjusted under 35 U.S.C. 154(b) by 0 days.

(21) Appl. No.: 10/081,698

(22) Filed: Feb. 21, 2002

Related U.S. Application Data

(62) Division of application No. 09/492,998, filed on Jan. 27, 2000.

(51) Int. Cl.[7] .............................. B32B 33/00; C09D 5/00
(52) U.S. Cl. .................... 428/40.1; 428/40.9; 428/41.5; 428/41.8; 106/287.35; 524/80; 524/81
(58) Field of Search ....................... 106/287.35; 524/80, 524/81; 428/40.1, 40.9, 41.5, 41.8

(56) References Cited

U.S. PATENT DOCUMENTS

| | | |
|---|---|---|
| 5,580,929 A | 12/1996 | Tanaka et al. |
| 6,072,024 A | 6/2000 | Irizato et al. |

*Primary Examiner*—David Brunsman
(74) *Attorney, Agent, or Firm*—Schweitzer Cornman Gross & Bondell LLP

(57) ABSTRACT

The problems of applying ink jet inks to various known coating surfaces so as to overcome smearing, poor resolution and attack by water etc., is overcome by the use of the new ink jet receptive media. The media comprises in combination: (1) a waterproof ink jet receptive coating, (2) a primer coating, (3) a non-porous substrate, (4) a pressure sensitive adhesive coating, (5) a silicone coating and (6) a backer layer. The receptive coating comprises the combination of: (1) binder, (2) charge control agent, (3) cross-linking agent, (4) adhesion enhancing agent and (5) dispersant. The absorption of the ink jet ink to the substrate is maximized, thus attracting and fixing the ink and providing a waterproofing effect.

9 Claims, 1 Drawing Sheet

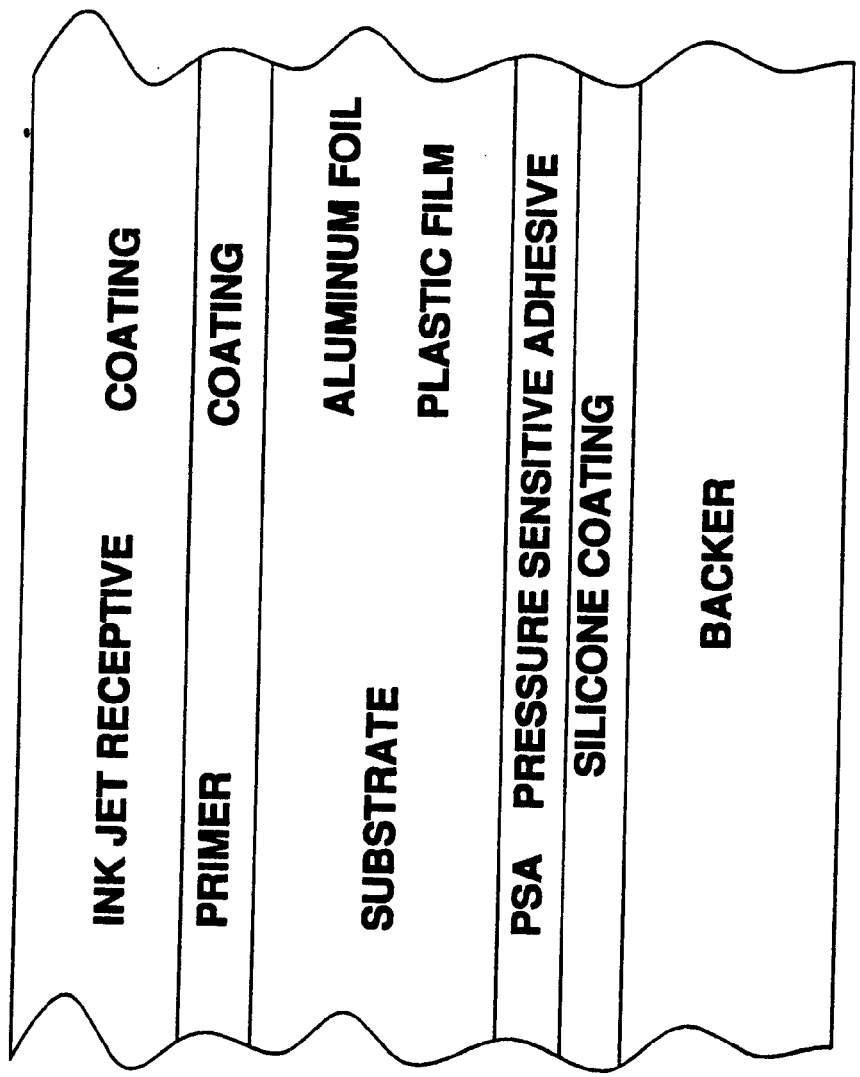

PRESSURE SENSITIVE INK JET MEDIA FOR DIGITAL PRINTING

RELATED APPLICATION

This application is a division of our co-pending application Ser. No. 09/492,998, filed Jan. 27, 2000, now pending.

BACKGROUND OF THE INVENTION

The existing pressure sensitive ink jet media for various commercial ink jet printers and inks, such as sold by Apple, Hewlett Packard, Canon, Epson and the like, work under the mechanism in which the ink absorption relies principally or partially on the absorption of the ink into voids of substrate fiber and/or silica gel pigment particles, and/or heavy coating thickness. It dries slowly. The print feathers, bleeds, and has low color saturation and poor resolution. The print smears readily, smudges easily, and requires immediate interleaving. The print also has a high water sensitivity and will be washed off upon contact with water such as under outdoor display conditions where it is subject to rain.

The current market does not offer waterproof aluminum foil/plastic film self-adhesive ink jet media. Due to the fact that these substrates are absolutely non-porous, non-absorbing, non-penetrating to ink jet inks, normal approaches are to increase the coating thickness (e.g., 17 g/m2), using significant loading of porous micro-absorbing white pigment (e.g., silica to resin=63.37), which result in opaqueness and poor resolution.

The present composition for forming an ink jet receptive coating to a base substrate overcomes the aforesaid problems of the prior art.

BRIEF DESCRIPTION OF THE PRESENT INVENTION

The present invention provides a water proof ink jet ink-receiving media with a pressure sensitive adhesive (PSA) applied to the back side for sticking to a receiving surface. While it comprises several coating layers applied to conventional substrate (as will be made more clear in FIG. 1), principal inventiveness resides in the composition of pressure sensitive ink jet receptive media. Its component elements provide a medium of excellent receptivity to ink jet printing and generate photorealistic output. The printed ink is fast drying (within a minute). The resulting image has a high resolution, relatively high gloss and exhibits bright, vivid and saturated color gamut. The printed image is free of feathering and bleeding and is resistant to abrasion and scratching as well as being water proof and outdoor weatherproof.

The ink jet receptive coating (top coating) of the present invention comprises the following components:

(1) Binder

The binder' function is to bond pigment particles to one another and to the surface of the plastic or foil substrate stock. The binder determines the viscosity of the coating mix and its drying characteristics. The binder has a great deal to do with the ink acceptance (hence the printability), the smoothing or calendaring properties, water and oil resistance, and the pick strength and foldability of the coated substrate.

(2) Charge Control Agent

Conductive polymers are selected to interact with the dye molecules on the ink receptive layer. Hydrophilic cationic homo-polymers or co-polymers having positive charges that are capable of electrically absorbing negatively charged ink jet ink ions are used. The positive charge carried by the conductive polymer attracts the anionic dye ions in the ink and thus functions to localize and fix the dye.

(3) Cross-Linking Agent

Inorganic and organic compounds capable of reacting with the primary polymer matrix by forming chemical or hydrogen bonds with its hydroxyl, carboxyl, NH or other functional groups to form a strong linkage are employed. They serve to increase melting point, reduce swelling after immersion in water, waterproof the network and provide abrasion, scratch and smudge/scuff resistance.

The composition can be self-crosslinking where it has hydroxyl functional groups; or other cross-linking agents such as epoxy, formaldehyde, or glyoxal can be incorporated.

(4) Adhesion Enhancing Agent

Gelatin, alpha-olefin such as polyethylene polypropylene, polyethylene acrylic acid and poly-acrylic acid may be incorporated in the present composition.

(5) Dispersant

Surfactant or wetting agents are employed to reduce the surface tension of the substrate so that the normal coating can be uniformly spread without streaking or other undesirable coating defects. Examples of surfactants include anionic polymers (polyacrylic, lignosulfonate, naphthalene sulfonate), alkali silicates, nonionic polymers (fatty alcohols, ethylene oxide), and various fluorinated surfactants.

(6) Porous Ink-Absorptive Pigment

Such pigments may optionally be present where a non-glossy product is desired. In such cases, various fine-grained, micro-porous, negatively or positively charged pigments such as silica gels are preferred.

The relative proportions of elements in the compositions of the present invention are set forth in Table 1 below with all percentages being on weight basis.

TABLE 1

INK JET RECEPTIVE COATING

| COMPONENT | BROAD RANGE | PREFERRED RANGE | ESPECIALLY PREFERRED RANGE |
|---|---|---|---|
| (1) BINDER | 5–40% | 10–30% | 15–25% |
| (2) CHARGING CONTROL AGENT | 20–50% | 25–45% | 30–40% |
| (3) CROSS-LINKING AGENT | 0.05–3% | 0.1–2% | 0.2–1% |
| (4) ADHESIVE ENHANCING AGENT | 0.1–5% | 0.5–3% | 1–2% |
| (5) DISPERSANT | 0.05–3% | 0.1–2% | 0.5–1% |
| (6) POROUS INK-ABSORPTIVE PIGMENT | 0–3% | 0.8–2% | 0.6%–1% |

The present ink jet receptive coating particularly resolves the difficulty of using non-permeable, non-porous, non-penetrating substrates which are non-absorptive to ink jet inks, such as polyester, styrene, vinyl, polypropylene films, aluminum foil, or metalized plain or holographic plastic films coated on the other side with pressure sensitive substrates. The resulting product is a digital printing medium which is pressure sensitive, self adhesive, and easy to apply.

The coating of the present invention specifically provides electrical attraction to ink jet ink and maximizes its absorption to the specific substrates utilized. The balance of the composition of the ink-receptive coating attracts and fixes ink. The polymers being utilized exhibit hydrophilic properties and are electrically positive charged and thus have the ability to absorb water and negatively charged ink. The polymers contribute excellent physical properties to the product. They have hydroxyl and/or carboxyl functional groups and can be either self-cross-linked or cross-linked by the addition of epoxy or other hardening agents to obtain necessary water-resistance and anti-abrasion properties.

DRAWINGS

FIG. 1 illustrates the overall structure comprising the ink jet receptive product according to the invention which comprises from the top down as illustrated:
(1) an ink jet receptive coating,
(2) a primer coating,
(3) a substrate,
(4) a pressure sensitive adhesive (hereinafter denoted as PSA) coating,
(5) a silicone coating, and
(6) a backer substrate.

DETAILED DESCRIPTION

Primer Coating

Before applying the ink jet receptive coating, the substrate surface is coated with a primer coating, which is called a subbing layer in the literature. The primer coating allows the ink receptive coating to form an integral bond with it and to the substrate, thus giving enhanced physical properties (adhesion; scuffing, rubbing and scratch resistance; etc.). These properties are obtained by the addition of an alpha-olefin polymer having 2–10 carbon atoms, e.g., polyethylene, polypropylene, polyethylene acrylic acid, polyacrylic acid, and/or natural polymers, e.g., cow bone gelatin, pigskin gelatin, fish gelatin, with or without cross-linking agents.

The following provides a further description of the key elements of the ink jet receptive coating:

1. Binder

The binder serves to hold the final coating together after the final coating has been applied to the substrate and dried. Suitable binders include, but are not limited to, gelatin (GEL), gelatin extenders, gelatin derivatives, graft polymers of gelatin, other natural polymers and synthetic hydrophilic colloidal homo-polymer and co-polymer, and aqueous dispersions of hydrophobic homo-polymer and co-polymer. Gelatin includes acid or base treated cow bone gelatin, pigskin gelatin and fish gelatin. Other natural polymers include albumin and casein, sugar derivatives such as cellulose (CEL) derivatives (e.g., hydroxyethyl cellulose, carboxymethyl cellulose, cellulose sulfate and cellulose acetate butyrate), sodium alginate, and starch derivatives. Synthetic polymers include polyvinyl acetate butyrate), sodium alginate, and starch derivatives. Synthetic polymers include polyvinyl alcohol (PVOH), polyvinyl alcohol partial acetal, polyethylene glycol (PEG), poly (2-ethyl-2-oxazoline) (PEOX), polyamides, acrylate derivatives (e.g., polyacrylic acid, polymethacrylic acid, polyacrylamide), polyvinyl imidazole, and polyvinylpyrazole and positively charged polyurethane. Dispersions using hydrophobic polymers such as polyvinylidone chloride, polyethlacrylate, or a hard thermoplastic acrylic co-polymers are applicable, as well. The binder is needed to support and keep the coating from cracking and being frail. As little binder as possible must be used, since the binder takes up space and lowers the micro pore ratio. In addition, to avoid hindering ink absorption, a non-swelling polymer must be selected. If the binder swells, it will block the penetration of ink. The supporting binder is at 20–45% solids. The weight percentage of binder is between 5–40%.

2. Charge Control Agent

The charge control agent refers to electrically conductive compounds, which are mainly focused on ionic polymers and electronically conductive polymers including electrically positively charged conductive homo-polymer or co-polymer. The charge control agents may also be called dye mordants, which are used to fix dyes. Commonly used charge control agents are cationic molecules such as cationic polyamide, polymeric quaternary ammonium compounds and amines, sodium cellulose sulfate, quaternary polyelectrolyte polymers. Hydrophilic cationic homo-polymers or co-polymers, having positive charges are capable of electrically absorbing negatively charged ink-jet ink ions. The positive charge carried by the conductive polymer attracts the anionic dye ions in ink and thus functions to localize and fix the dyes. To perform this function efficiently, the type of the polymer carrying positive charge must be carefully selected to interact with the dye molecules on the ink receptive coating. The use of conductive polymers is disclosed in many patents, such as, for example, U.S. Pat. Nos. 2,882,157, 2,972,535, 6,615,531, 3,938,999, 4,460,679 and 4,960,687 which are incorporated by reference. Poly (vinyl benzyltrimethyl ammonium chloride)(PVBTMAC) and poly (diallyidimethyl ammonium chloride)(PDADMAC), and an aqueous dispersions of positively charged urethane resin are three examples of suitable conductive polymers. The weight percentage of charge control agent is between 20–50%.

3. Cross-linking Agent

The cross-linking agents of the present invention refer to inorganic and organic compounds which are capable of reacting with the prime polymer matrix by forming a chemical bond or hydrogen bond with its hydroxyl, carboxyl, NH or other functional groups to form strong linkage to increase its melting point, reduce its swell after immersion in water, and to enable the network become water-proof as well as an, abrasion/scratch/smuggler resistant material. Inorganic compounds include aluminum sulfate, potassium and ammonium alums, and zinc ammonium carbonate. Organic compounds serving as a cross-linking agent include activated esters, aldehydes, including formaldehyde, glyoxal, N-methylol, and other blocked aldehyde, aziridines, carbodimides, isoxazolium salts (unsubstituted in the 3 position of the ring), carbonic acid derivatives, carboxylic and carbamic acid derivatives, epoxides, active halogen compounds, ketones, active olefins, blocked active olefins, polymeric compounds such as dialdehyde derivatives of starch and other polysaccharides, quinones, sulfonate esters, sulfonyl halides, s-trizines, and their mixtures. The weight percentage of crosslinking agent ranges from 0.05 to 3%.

4. Adhesion Enhancing Agent

A specific adhesion-enhancing agent is added to the ink jet composition. The agent can be a primer or resin, which is a polymer dispersion exhibiting good affinity for unprimed polyester, styrene, vinyl, polypropylene, aluminum foil or other non-porous, non-ink penetrating substrates. Suitable polymers include, but are not limited to, natural polymers and synthetic hydrophilic colloidal homo-polymers and co-polymer, selected from gelatin (GEL), and aqueous dispersions of hydrophobic homo-polymer and co-polymer. For instance, alpha-olefin polymer, e.g., polyethylene, polypropylene, polyethylene acrylic acid, and poly-acrylic acid, are useful in this invention. Gelatin includes acid or base treated cow bone gelatin, pigskin gelatin and fish gelatin. Other natural polymers include albumin and casein, sugar derivatives such as cellulose (CEL) derivatives (e.g., hydroxyethyl cellulose, carboxymethyl cellulose, cellulose sulfate, and cellulose acetate butyrate), sodium alginate, and starch derivatives. Synthetic polymers include polyvinyl alcohol (PVOH), polyvinyl alcohol partial acetal, polyethylene glycol (PEG), poly (N-vinyl) pyrrolidone (PVP), polyvinyl acetate (PVA), polyethylene oxide (PEO), poly (2-ethyl-2-oxazoline) (PEOX), polyamides, acrylate derivatives (e.g., polyacrylic acid, polymethacrylic acid, polyacrylamide), polyvinyl imidazole, and polyvinyl pyrazole. Dispersions using hydrophobic polymer such as polyvinylidone chloride, polyethlacrylate, or a hard thermoplastic acrylic co-polymer are applicable, as well. The adhesion enhancing agent comprises 0.1 to 5 wt % of the composition.

5. Dispersant

Suitable dispersants are a specific group of surfactants or wetting agents, which reduce the surface tension of the substrates so that the novel coating can be uniformly spread, and well carried out on the specific substrate surface without streaks, pinholes, fish eyes, comet, and other undesirable coating defects (a condition which is termed "mottle"). Ionic and non-ionic surfactants as well as fluorinated surfactants ar disclosed in many patents, such as, for example, U.S. Pat. Nos. 2,600,831, 2,719,087, 2,982,651, 3,026,202, 3,428,456, 3,457,076, 3,454,625, 4,267,265, 4,510,233, 4,847,186 and 4,916,054 and European Patents 245,090 and 319,951, which are incorporated by reference.

Examples of applicable surfactant include Ninol 96 SL, methyl ester of lauramide DEA, Makon 10, alkoxylate from Stepan Maplofix 563, sodium lauryl sulfonate from onyx Hostapur SAS 93, secondary alkanesulfonate, sodium salt, from American Hoechst Daxad 11, sodium naphthalenesulfonate-formaldehyde dispersant from Hampshire Igepal, nonyl phenoxy poly(ethyleneoxy)ethanol, Mona-70E, sodium dioctyl sulfosuccinate, Monateric CAB-LC, cocamidopropyl betaine, Monamid 716, lauramide DEA, linear alkylbenzene sulfonate from Mona, Triton X-100, octyl phenoxy polyethoxy ethanol, Triton X-200, alkylaryl polyether sulfonate from Rohm & Haas, Surfynol 104, acetylenic diol (2,4,7,9 tetramethyl-5-decyne-4, 7 diol) from Air Products, FC-170C, fluorochemical from 3M, Bio-Soft D-40, sodium dodecyl benzene sulfonate, Slip-Ayd SL-530, polyethylene in 2-butoxythanol from Daniel Products, and Pluronic L-61, polyoxyethylenepolyoxypropylene glycol from BASF.

The dispersant will comprise 0.05 to 3 wt % of the composition.

6. Porous. Ink-absorptive Pirment

The component is used where a non-glossy product is desired. Aluminum oxide, alumina hydrate, boehmite, precipitated calcium carbonate, titanium dioxide, fumed silica, precipitated silica, polymethylmeth-acrylate (PMMA), starch, polyterefluoro-ethylene (PTFE) can be used. Better results can be obtained with fine-grained, micro-porous, neutrally or positively charged pigments, for instance, silica gels. Silica gel consists of primary particles of 2–20 nm, which from agglomerates of 2–10 microns; specifically, the grades with higher absorption capacities and cationic serve better. Silica is the only one of the white pigments which available in grade with oil absorption value greater than 100 g oil/100 g pigment. Silica gel is preferred to the other types of silica because of its availability in particular particle sizes, which give a more open coating structure per particle volume, and because the silica gel particles do not break down under shear during mixing operations. Submicron silica gels, average particle size no more than 0.3 micron, with positive zeta potential in aqueous solution or slurry, are preferred. The pigment comprises 0 to 3 wt % of the present coating. When producing a non-glossy product, it typically will comprise 0.8-2 wt % of the composition.

Base Substrates

The base substrates can be chosen from a variety of flexible material including the following:

a. Resin coated papers, for instance, alpha-olefin polymer having 2 to 10 carbon atoms, such as, polyethylene, polypropylene, ethylene-butene co-polymer, etc.

b. Board.

c. Fabric.

d. Supported and non-supported plastic films and tapes, such as cellulose nitrate, cellulose a cetate, cellulose acetate butyrate, cellulose acetate propionate, polypropylene, polystyrene, polycarbonate, polyvinyl acetyl, polyethylene, polyvinyl alcohol, terephthalate, with application including gloss, matte, transparent, projectable, holographic, fluorescent, metalized golden, silvery, chrome colored films.

e. Laminated gold, silver, chrome aluminum foil products may also be used.

The base substrate is laminated with pressure-sensitive adhesives (PSA) before or after ink jet receptive layer coating is applied.

Method of Application

To apply the new coating, various coating methodologies can be utilized. For instance, Meyer rod, bar dipping, slot, air-knife curtain, roll, direct gravure, reverse gravure, three or four roll reverse roll gravure, micro-gravure, spray . . . etc, are applicable. The preferred coating weight is 4–5 grams/m$^2$.

Cross-linking agents or hardeners are added and well mixed into the final solution just before the coating. If gelatin is used, an on-line mixer can be used as a manner of continuous hardener addition with the final solution. The jacket temperature needs to be precisely controlled so that the solution final is maintained at 37–43 degrees C., or 99–110 degrees F., during the entire coating operation.

Where gelatin is used as a binder, the moving web travels into a chiller and then into a dryer. The chiller causes the gelatin-based coating to gel or solidify. In this manner, the coating is prevented from intermixing during the drying thereof in the dryer. In the dryer, ink jet composition is dried (i.e., the solvent is removed). More precisely, all but residual solvent is removed from the coating, residual solvent is that solvent which is chemically or physically bound to the binder or is otherwise not removable by drying under ambient conditions. In other words, when substantially dry, the solvent content of the binder tends to be in a nearly steady state equilibrium with the environment at ambient temperature, pressure, and humidity. For example, when gelatin is used as the binder, water is normally used as the solvent/carrier fluid for the coating. Depending upon the particular type of gelatin used, the coating is dried in dryer for a period of about 1.5 to 9 minutes, at a temperature of about 60 degrees to 130 degrees F. Residual water typically amounts to between 5% and 20% water, by weight, in substantially dried gelatin, again depending upon the particular type of gelatin used. If synthetic polymer binders are used instead of gelatin, a chiller is not needed. The preferred oven temperature is 170–180° F. (80–85° C.) for 4–5 minutes or equivalent. After the initial drying, the coated roll should be left to stay overnight at room temperature to receive a natural incubation before it can be used for ink jet printing. Coating weight is measured by "cut and weight" technique.

Pressure Sensitive Coating and Silicone Release Liner

The novel ink jet coated substrate (plastic film, foil, fabric and paper media) described above can be coated directly or indirectly with a pressure sensitive adhesive (PSA) and laminated with a protective silicone coated release backer. Such protective silicone coating backers are well known in the prior art. The resultant product is pressure sensitive.

The PSA can be applied directly to the backside of the ink jet media or indirectly over the silicone coating on the backer sheet and laminated together, creating a sandwich type construction with the ink jet film on top, the PSA in the middle, and the protective silicone coated backer on the bottom. The overall media construction has previously been described relative to FIG. 1.

The PSA is formulated from polymers, either in water or solvent based vehicles or radiation curable systems. Polymers useful in formulating water base PSAs are acrylic, vinyl acrylic, styrene acrylic, urethane acrylic and butyl acrylate. Peel adhesion, tack level, creep and shear resistance, viscosity, age resistance, crosslinking, hardness, and softness can be adjusted to a desired end point by selecting the appropriate additives. Similar chemistry is true for solvent based and radiation curable PSA systems.

Solvent based PSAs offer the greatest variety of formulating opportunities, resulting in a greater variety of possible adhesives. Radiation curable systems are the most limited in variety, and the water base systems are somewhere in between.

Backer and Silicone Coating

The backer substrate can be polyethylene coated bleached kraft, clay coated kraft, polyester film, polypropylene film, polyethylene film, and polystyrene film, which are coated with a cured silicone resin system. The silicone systems are catalyzed and cross-linked to prevent the silicone from migrating to the adhesive and contaminating its properties. The surface of the backer substrate must have good hold-out properties to prevent absorption of the silicone before drying and curing. The backer substrate and silicone coating are protective layers protecting the PSA and carrying the substrate through the ink jet printer.

Pressure Sensitive Adhesive (PSA)

The pressure sensitive adhesive is placed on the non-coated side of the substrate. The PSA will allow the ink jet printed copy to be mounted and/or adhered to almost any receiving surface like a wall, window, sign, craft, tile, etc.

Waterbased, solvent based and radiation curable systems may be use in the present invention. Examples thereof are set forth below.

| Waterbased | |
| --- | --- |
| Acrylic Polymer Emulsion, | PN-3579-1 H. B Fuller 1530 Lexington Avenue, St. Paul, MN (800)468-6358 |
| Acrylic Polymer Emulsion, | Gelva GME 2234 Solutia, 10300 Olive Blvd, St. Louis, MI |
| Acrylic Polymer Emulsion, | 72-9292, National Starch & Chemical Co., 10 Finderne Avenue, Bridgewater, NJ |
| Acrylic Polymer Emulsion, | Covinax 222, Franklin International, 2020 Bruck Street, Columbus, OH |
| Acrylic Polymer Emulsion, | Phoplex N-500, Rohm & Haas Co. 100 Independence Mall West, Philadelphia, PA |
| Solvent Based | |
| Acrylic Polymer Solution, | SCC-134B H. B. Fuller, 3530 Lexington Avenue, St. Paul, MN |
| Acrylic Polymer Solution, | Gelva GMS 1753, Solutia, 10300 Olive Blvd., St. Louis, MI |
| Acrylic Polymer Solution, | Durotak 80-1058, National Starch & Chemical, 10 Finderne Avenue, Bridgewater, NJ |
| Radiation Cured | |
| Urethane/Acrylic Polymer 100% Solid, | Uninax 347-54-3A, manufactured by Franklin International, 2020 Bruck Street, Columbus, OH |

Coating of PSA

Water based and solvent based PSAs are commonly coated by the following coating methods:
  a. Meyer rod
  b. Direct and indirect gravure
  c. Knife over-roll
  d. 3 and 4-roll reverse roll coaters These coating methods are designed to meter and apply liquid PSAs onto a moving web in a continuous, smooth defect-free matrix. The viscosity of the PSA will vary depending on the coating method. The viscosities for Meyer rod and gravure coatings preferably will be in the range of 100–1500 cps, while that of knife-over-roll and reverse-roll methods are 300–50,000 cps. In most of the cases, the Meyer rod is applied PSA is near 300–1000 cps and reverse-roll at 5,000–8,000 cps. Radiation cured PSAs can also be applied to a moving substrate with various coating methods selecting of which will depend on the rheology of the PSA.

Drying

The most common method for drying water and solvent base PSAs on moving substrate is to pass the web through a high efficiency convection drying oven designed with high velocity nozzles and exhaust systems. Length of the oven will depend on the coating weight, temperature, web speed, and evaporation rate of the vehicle', solvents, and/or water used in the PSA formula. The temperature will vary. However, usually a temperature of 52–93 degrees C. (125–200 degrees F.) is used at the first stage of the oven and is being gradually and eventually increased to 93–150 degrees C. (200–300 degrees F.) at the last stage of the oven. The final temperature or the temperature of last stage of the oven is dependent on the formula. If the vehicle (or solvent) in the formula has large and bulky molecules, the evaporation rate will be higher, which requires higher drying temperatures. In addition to evaporation of the vehicles, many adhesives require cross-linking where they form a covalent bond between the polymer molecules, improving the cohesive strength and creep resistance. This is an important property for adhesives used in ink jet PSA products.

For water based PSA systems, the adhesive polymers take the form of tiny spheres, approximately 10,000 Armstrong in diameter, dispersed in water. The water acts as a vehicle to keep the spheres separated in the dispersion. As the water is evaporated, the spheres begin to come together and coalesce forming a film when the water is completely evaporated. For solvent based systems, as the solvent diffuses through the adhesive polymers, the adhesive forms a film when the solvents are completely evaporated. In either case the drying must provide the heat source to vaporize and remove the vehicle.

Radiation cured PSAs do not depend on evaporation of vehicles to form a film. Radiation cured adhesives are 100% solid containing monomers, oligomers, photo initiators, and other additives. After they are coated onto a moving substrate and exposed to radiation, the energy causes them to crosslink and polymerize, forming a film.

Laminating

After the dried and cured adhesive exits the oven, it goes directly to a lamination station where the ink jet coated media substrate is laminated to a silicone release liner between a rubber and steel roll. In the case where the PSA is coated directly on to the backside of the media substrate, the adhesive stays where it is. In the case where the PSA is coated over the silicone coating of the backer substrate, the adhesive will transfer to the back of the media substrate upon lamination. In both cases, it will form a final structure where the media coating stays on the top, a PSA coating bonded to the backside of the media substrate and is in the middle, and a silicone coated backer protecting the PSA is on the bottom. In application, the backer substrate will be removed to expose the PSA when the printed media is applied and adhered to a receiving surface.

TESTING

The following test procedures were employed in evaluating the product of the present invention.
(1) Printing
  Print the media with Apple, IIP, Canon, or Epson Ink Jet printers with test patterns containing colored blocks (cyan, magenta, yellow, red, green, blue and black). The black ink may be composite or separate component, the setting is photo quality ink jet paper or transparencies, at 1440 dpi or lower.
  Drying time: record ink drying time right after the printing.
  Waterproof test: leave under running tap water for two hours.
  Smudge test: under tap water, smudge the image using a finger.
(2) Coating Adhesion:
  Use 3M 601-tape to perform adhesion test between ink receptive coating and the substrate. Pressure Sensitive Peel Adhesion (180 degree angle): Use a Tensile Tester for example an Instron Model loll to measure. Peel adhesion measures the force to remove a pressure sensitive adhesive from a stainless steel panel at a specific width, angle and speed. The adhesive is applied at a standard 4 pound pressure to a stainless steel panel as a 1" wide strip. The force to peel the strip away at 90° or 180° angle from the stainless steel panel is expressed in grams per inch or grams/cm.
  Release Properties PSTC #4: A Tensile Tester is used to measure the force required to peel the pressure sensitive adhesive away from the silicone coated backer (PSTC #4). The PSTC #4 test is performed the same as the PSTC #1 and the results are expressed the same.

The Pressure Sensitive Tape Council (PSTC), a manufacturers' trade association, has several tests for measuring peel, e.g., peel adhesion (PSTC #1) at 180° degree angle, Adhesion to Liner (PSTC #4) of Pressure Sensitive Tapes at 180° angle.

EXAMPLES

Example 1

The following components were mixed at room temperature to form the ink jet receptive composition. 1 gram of slurry or aqueous dispersed silica gel, average size at 0.3 micron with a positive zeta potential, (commercially available from Grace Division), was added to 6 grams of OF-280, a cationic co-polymer, dimethyl-diallyl-ammonium chloride/acrylic acrylic with 80/20 ratio and 35% activity molecular weight 250–400K, (commercially available from Calgon Company), under agitation. 32 grams of IJ-2, positively charged polyurethane (commercially available from Esprit Company) were then added and well mixed. 35 grams of tap water were added. 8 grams of 10% aqueous solution of Daxad 11, Sodium napthalenesulfonate-formaldehyde dispersants (commercially available from Hampshire Corporation) were added afterwards.

Two grams of Lucidene 901 polyethylene acrylic acid (commercially available from Morton Corporation) were then added to the mixture. 2.2 grams of Carboset GA-33, acrylic dispersion having less carboxyl function group in the molecule, (available from BF Goodrich) were then mixed in. 20 grams of second tap water were finally added to the mixture. Right before coating, 0.2 grams of CR-5L a crosslinking agent from Esprit Company, were added and mixed.

Then 19.51 grams of 0.4% Glyoxal HCOCHO dialdehyde, (commercially available from Aldrich Fine Chemicals Company) were added to the final composition.

The pot life was about 24 hours. A #18 Meyer rod was used to hand-coat the mixture. The substrate was Fasson pressure sensitive laminated foil, 55# bright gold no score/no black-print with super permanent adhesive. The coating was oven dried at 170° F. for 4 minutes and then incubated at room temperature overnight. The coating was printed in the Epson stylus color 850 under the setting of "Photo Quality Ink Jet Paper with microwave on, and HT (Error Diffusion), then at the resolution of 1440 dpi. A custom setting with auto adjustment to maximum contrasting and saturation was used. Testing results showed that the image was dried in less than 1 minute. The print was placed under the running tap water for 2 hours; no washout was observed. The print was tested for finger smudging. It was not damaged in any way. It was proven to be water-fast, smudge, scrub, and scratch resistant. The adhesion between the ink receptive coating and the substrate was tested as acceptable.

Release properties were measured at:
Liner to foil/film:
  PSTC-4=8.33 grams/2"
  PSTC-4 (24 HR) =11.33 grams/2"
The results were within the specifications.

Example 2

Part A: 600 grams of poly (diallyldimethylammonium chloride), commercially available from Aldrich, 20% by weight in water, average molecular weight 400–500K, under vigorous agitation were mixed with 3200 grams of IJ-2 (commercially available from Esprit Company), 3500 grams of distilled water were then added after 800 grams of 10% by weight aqueous solution of Triton X-100, Polyoxyethylene-polyoxypropylene glycol, a wetting agent, (commercially available from Rohm & Haas Company), were added afterwards. 20 grams of Pruronic L-61, Octylphenoxypolyethoxyethanol nonionic surfactant, a defoamer, (commercially available from BASF Corporation), were added to the mixture. 200 grams of Carboset CR-761 (commercially available from BF Goodrich Company), were added to the mixture 20 grams of CR-5L, an aliphatic epoxy compound (commercially available from Esprit), were added.

Part B: 600 grams of pigskin pharmaceutical grade gelatin, 11337 Type 56, (commercially available from SKW Biosystems), was soaked in 2000 grams of cold distilled water for 30 minutes. The temperature was raised to 40 degrees C. or 104 degrees F. and the solution was agitated for another 30 minutes.

Coating Final: at 40 degrees C. or 104 degrees F., part A was mixed with part B.

In-line Mix: using a stationary mixer at weight ratio=60 mL/min of coating final to 11 mL/min of 10% aqueous solution of GXL-100, pyridinium, 1-[(dimethylamino)-carbonyl]-4-(2-sufoethyl), inner salt (commercially available from Esprint). A slot coating station was used. The coating speed was 300 fpm. The coating temperature was maintained at 37–43 degrees C. (99–110 degrees F.). The drying paths included a chill zone, several low temperature zones, medium temperature zones, high temperature zones (up to 77 degrees C. or 170 degrees F.), and a balance zone (see the drying description in the ink receptive coating part of this application) with a total length of 100 meters (328 feet).

The substrate was VA bright silver 80#, ½ mil aluminum foil with a vinyl acrylic lacquer coating laminated to bleached kraft, commercially available from Alufoil Products Company. The substrate was a pre-coated using a slide coating station with water base sulphonated polyester dispersion to give ⅓ mil dry thickness.

UV curable pressure sensitive adhesive, Uninax 347-54-3A, a 100% solids UV curable urethane acrylate polymer, containing 36.2% by weight urethane acrylate oligomer, and 30.5% acrylic monomers, (commercially available from Franklin International) was coated by the same methodology to give a thickness of 0.4 mil on the backer substrate. A radiation curing device with two 200 Watt UV lamps at vertical distance of one inch above the web was used for the polymerization. The cured adhesive was carried directly to a lamination station where the ink jet substrate was coated and laminated to a silicone release liner between a rubber and steel roll. It formed a final structure where the media coating stayed on the top, a PSA coating bonded to the backside of the media was in the middle, and a silicone coated backer, protecting the PSA, was on the bottom.

The dried coating roll was incubated at room temperature for 1 week. The coating was printed in an HP ink jet printer 895 Cse, under the setting of "Ink Jet Transparencies" at the resolution of 700 dpi. The print was placed under running tap water for two hours. No washout was observed. The image was tested for finger smudging. The print was not damaged in any way. It was proven to be water-fast, smudge, scrub, and scratch resistant.

The adhesion between the ink receptive coating and the substrate was tested acceptable.

Peel adhesion properties were measured at PSTC #1=1000–1200 grams/in.

Release properties were measured at:

PSTC-4=7.8 grams/2"

PSTC-4 (24 Hr)=12.3 grams/2"

The results were within the specifications.

As indicated above, the present invention provides a medium for receiving ink jet printing which offers excellent receptivity and photorealistic output. The resulting image has high resolution, bright color and is free of feathering and bleeding as well as resistant to water and can be adhered to almost any receiving surface like an outside poster or sign.

Various modifications can be made by those skilled in the art without departing from the spirit of the present invention. Accordingly, reference would be made to the following claims to determine the full scope of the invention.

We claim:

1. A waterproof pressure sensitive adhesive (PSA) ink jet receptive media comprising, in combination:
   (1) a waterproof ink jet receptive coating, comprising
      (a) 5 to 40% binder,
      (b) 20 to 50% charge control agent,
      (c) 0.05 to 3% cross-linking agent,
      (d) 0.1 to 5% adhesion enhancing agent, and
      (e) 0.05 to 3% dispersant;
   (2) a primer coating,
   (3) a non-porous substrate,
   (4) a pressure sensitive adhesive (PSA) coating,
   (5) a silicone coating, and
   (6) a backer layer.

2. The media of claim 1 wherein said non-porous substrate is selected from the group consisting of resin coated papers, boards, fabrics, plastic films and tapes, metallic substrates and metalized products.

3. The media of claim 1 wherein the pressure sensitive adhesive layer is applied to the opposite side of the substrate.

4. The media of claim 1 wherein the charge control agent of said ink jet receptive coating is a hydrophilic cationic polymer having positive charges capable of electrically absorbing negatively charged ink ions.

5. The media of claim 1 which proceed in order from top layer (1) to bottom layer (6).

6. The media of claim 1 where the PSA coating is formed from a number of the group consisting of acrylic, vinyl acrylic, styrene acrylic, urethane acrylic, and butyl acrylic.

7. The media of claim 1 wherein the ink jet receptive coating further contains a porous ink-absorptive pigment so as to produce a non-glossy product.

8. The media of claim 1 wherein the pressure sensitive adhesive layer is formed from a number of the group consisting of water based, solvent based and radiation curable systems.

9. The media of claim 8 wherein an acrylic polymer emulsion or solution is incorporated in the pressure sensitive adhesive layer.

* * * * *